(12) United States Patent
Tsukahara et al.

(10) Patent No.: US 9,479,722 B2
(45) Date of Patent: Oct. 25, 2016

(54) TELEVISION RECEIVER, TELEVISION BROADCAST RECEIVING METHOD AND MOBILE TERMINAL

(71) Applicant: Sony Corporation, Tokyo (JP)

(72) Inventors: Kouki Tsukahara, Saitama (JP); Hideki Nozawa, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 14/650,163

(22) PCT Filed: Jan. 14, 2014

(86) PCT No.: PCT/JP2014/000112
§ 371 (c)(1),
(2) Date: Jun. 5, 2015

(87) PCT Pub. No.: WO2014/147925
PCT Pub. Date: Sep. 25, 2014

(65) Prior Publication Data
US 2015/0319395 A1    Nov. 5, 2015

(30) Foreign Application Priority Data

Mar. 21, 2013   (JP) .................. 2013-057820

(51) Int. Cl.
| | | |
|---|---|---|
| H04B 1/18 | (2006.01) | |
| H04B 17/00 | (2015.01) | |
| H04N 5/44 | (2011.01) | |
| H04N 5/50 | (2006.01) | |

(Continued)

(52) U.S. Cl.
CPC .............. *H04N 5/50* (2013.01); *H04B 1/006* (2013.01); *H04B 1/18* (2013.01); *H04B 7/0814* (2013.01); *H04B 7/0822* (2013.01); *H04N 5/4401* (2013.01); *H04N 21/41407* (2013.01); *H04N 21/4383* (2013.01); *H04N 21/4622* (2013.01); *H04B 7/0837* (2013.01); *H04B 7/0871* (2013.01)

(58) Field of Classification Search
USPC ......... 455/133, 136, 140, 556.1, 556.2, 557, 455/67.11, 132, 150.1, 170.1, 188.1, 188.2, 455/272, 275, 277.1, 277.2, 286
See application file for complete search history.

(56) References Cited

U.S. PATENT DOCUMENTS

| | | | |
|---|---|---|---|
| 7,034,898 B1 * | 4/2006 | Zahm ................. | H04B 7/082 348/725 |
| 7,701,515 B2 * | 4/2010 | Gomez ................. | H04N 5/46 348/731 |

(Continued)

FOREIGN PATENT DOCUMENTS

| | | |
|---|---|---|
| EP | 0676870 A1 | 10/1995 |
| JP | 2006-135845 A | 5/2006 |

(Continued)

*Primary Examiner* — Blane Jackson
(74) *Attorney, Agent, or Firm* — Wolf, Greenfield & Sacks, P.C.

(57) ABSTRACT

There is provided an apparatus comprising a plurality of antenna terminals, a first switch configured to select an antenna terminal of the plurality of antenna terminals, a second switch configured to receive an output of the antenna terminal from the first switch and divide the output of the antenna terminal into a first output and a second output, a surface acoustic wave filter configured to receive the first output from the second switch, and a tuner/decoder configured to receive an output of the surface acoustic wave filter and the second output.

14 Claims, 10 Drawing Sheets

(51) Int. Cl.
*H04B 1/00* (2006.01)
*H04B 7/08* (2006.01)
*H04N 21/414* (2011.01)
*H04N 21/438* (2011.01)
*H04N 21/462* (2011.01)

(56) References Cited

U.S. PATENT DOCUMENTS

| | | | |
|---|---|---|---|
| 2006/0025092 A1* | 2/2006 | Sanders | H04N 5/4401 455/161.1 |
| 2006/0035620 A1 | 2/2006 | Millard et al. | |
| 2006/0194562 A1 | 8/2006 | Marrah et al. | |
| 2007/0004345 A1* | 1/2007 | Ono | H04B 7/0805 455/78 |
| 2009/0137273 A1* | 5/2009 | Yamaguchi | H04B 1/3805 455/556.1 |
| 2011/0069787 A1 | 3/2011 | Lee et al. | |
| 2012/0188462 A1* | 7/2012 | Lynn | H01Q 1/24 348/725 |
| 2013/0003783 A1 | 1/2013 | Gudem et al. | |
| 2015/0055020 A1* | 2/2015 | Yoshino | G06F 13/385 348/706 |

FOREIGN PATENT DOCUMENTS

| | | |
|---|---|---|
| JP | 2008-193384 A | 8/2008 |
| JP | 2013-038520 A | 2/2013 |
| WO | WO 2012/172909 A1 | 12/2012 |

\* cited by examiner

TELEVISION RECEIVER, TELEVISION BROADCAST RECEIVING METHOD AND MOBILE TERMINAL

CROSS REFERENCE TO RELATED APPLICATIONS

This application claims the benefit of Japanese Priority Patent Application JP 2013-057820 filed Mar. 21, 2013, the entire contents of which are incorporated herein by reference.

TECHNICAL FIELD

The present disclosure relates to a television receiver, a television broadcast receiving method and a mobile terminal capable of receiving television broadcasts satisfactorily in any of a case of directly receiving television broadcasts using antennas or a case of receiving television broadcasts through cables.

BACKGROUND ART

Mobile terminals such as tablet terminals and tablet PCs include antennas and television tuners, and thus the mobile terminals may directly receive (hereinafter, referred to as "air-reception") television broadcasts using the antennas (See PTL 1). For example, if terrestrial digital broadcasts (full segment/one segment) and multimedia broadcasts for mobile terminals are intended to be received, television broadcasts can be received in the outdoors, and thus the convenience of the mobile terminals can be improved.

When tuners are mounted on the tablet terminals, it is desirable to automatically select an antenna having a highest quality among the provided antennas in a going-out destination. For example, it is assumed a case where an earphone antenna is connected with an intention to listen to audio when as well a rod antenna is connected without being extended. With the user not being aware, the tuner determines that the earphone antenna is most suitable through an automatic determination, and thus viewing is possible with the earphone antenna. Of course when an earphone or a cable is not connected, switching to the rod antenna is performed.

On the other hand, when the user returns home, reception through a connection with an antenna terminal that has reached the wall is more stable than continuing reception with the antenna. In this case, it is desirable that an F-type connector be provided in a cradle and connection through a cable be possible. Further, by adding such a function, a lifestyle such as recording programs while charging during the time the user is at home and viewing at a going-out destination is possible. Likewise, it is desired to realize optimum television viewing by automatically switching an antenna in both the going-out destination and indoors.

There is a method in which a plurality of antennas are provided, and the antennas are switched in a real time manner so as to maintain good reception state. However, there is a problem in that it is very laborious to detect which antenna can receive a broadcast at the optimum level and to automatically switch antennas, and a switching time becomes long. The antenna switching can be performed manually, but in this case, it bothers the hand of the user operating a mobile terminal. Moreover, in order for the user to select an antenna appropriately, it is necessary for the user to have technical knowledge.

Furthermore, it is possible to receive a television broadcast better by using the antennas provided in homes, apartments or the like, as compared to the antennas with which the mobile terminals are equipped. For example, the antenna terminal (for example, F-type connector) on the wall surface and the node of the mobile terminal are connected through a coaxial cable. If the television broadcast which has been well received is not only viewed but also recorded in the mobile terminal, it is possible to replay and enjoy the program content.

In some apartments, cable television (CATV) has been introduced so as to receive terrestrial digital broadcasts. In CATV, a trans-modulation method and a pass-through method are known as a method of transmitting the terrestrial digital broadcasts. The trans-modulation method is a method of converting received waves by a CATV station into a modulation method suitable for CATV and transmitting converted waves. In the trans-modulation method, it is necessary to connect a Set Top Box (STB) to a television receiver to receive CATV digital broadcasts.

The pass-through method is a method of transmitting received waves without changing a modulation method. Further, an example of the pass-through method includes a same frequency pass-through method of retransmitting the waves of a UHF band used in the terrestrial digital broadcasts without changing the frequency, and a frequency conversion pass-through method of converting the waves into a frequency different from the frequency of broadcast and retransmitting the converted waves. In the pass-through method, the STB is not necessary. In a case of the same frequency pass-through method, it is possible to receive a broadcast in a television receiver for receiving a general terrestrial digital broadcast. In a case of the frequency conversion pass-through method, the terrestrial digital broadcast can be viewed in a "CATV pass-through support" television receiver in which the reception range of the frequency after conversion is broadened to a range other than the UHF band. Television receivers, tuners, and the like which are commercially available are mostly "CATV pass-through support" products.

Figure 1A:
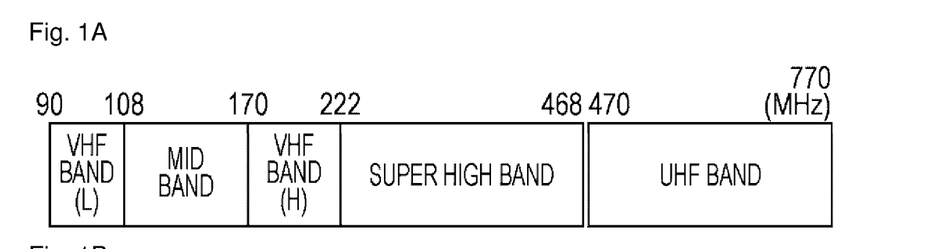
FIG. 1A is a schematic diagram used to describe a transmission band included in a television broadcast.

FIG. 1A shows band allocation in Japan. A transmission band of broadband facilities is 90 to 770 [MHz]. This band is divided as follows:
VHF band (low band) (denoted as VHF-L) (90 to 108 [MHz])
Mid band (denoted as MID) (108 to 170 [MHz])
VHF band (high band) (denoted as VHF-H) (170 to 222 [MHz])
Super-high band (denoted as SHB) (222 to 468 [MHz])
UHF band (denoted as UHF) (470 to 770[MHz])

In a case of the frequency conversion pass-through method, it is possible to transmit a television broadcast by using, for example, a super-high band. Accordingly, the "CATV pass-through support" products are intended to receive all the above described bands (90 to 770 [MHz]). The super-high band is allocated to other applications in a case of radio waves, but since the super-high band becomes an interfering factor at the time of air-reception, it is necessary to block the reception of the super-high band by using a filter.

Figure 1B:
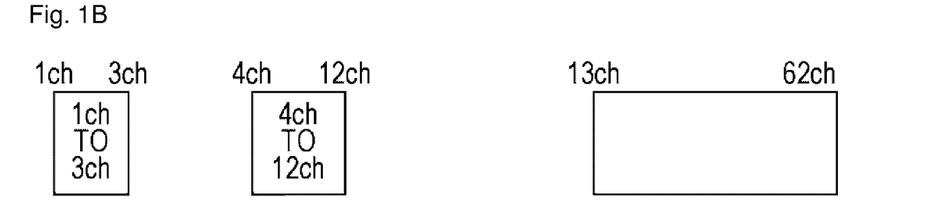
FIG. 1B is a schematic diagram used to describe a transmission band included in a television broadcast.
Figure 1C:
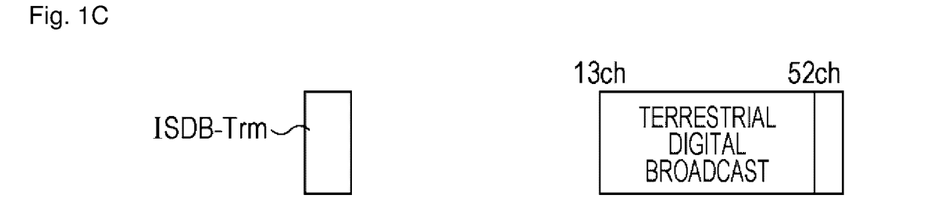
FIG. 1C is a schematic diagram used to describe a transmission band included in a television broadcast.

In a case of the terrestrial analog broadcasts in the related art, as shown in FIG. 1B, frequency bands of VHF-L (1 to 3 channels), VHF-H (4 to 12 channels), and UHF (13 to 62 channels) have been used. As shown in FIG. 1C, since the terrestrial digital broadcast uses UHF (13 to 52 channels) band, in a case of the air-reception of the terrestrial digital broadcast, the UHF may be able to be received.

In recent years, the provision of multimedia broadcasts for mobile terminals has started using a part (207.5 to 222 [MHz]) of the band of VHF-H of the terrestrial analog broadcasts that is obsolete. One of the standards of the multimedia broadcasts for a mobile terminal is Integrated Services Digital Broadcast Terrestrial Mobile Multi-Media Broadcast (ISDB-Tmm). ISDB is a method for digital broadcast that has been adopted in Japan, the Philippines, and Latin America. A family of ISDB includes, in addition to ISDB-Tmm, ISDB-S for satellite digital broadcasts, ISDB-T for terrestrial digital broadcasts, ISDB-TSB for terrestrial digital audio broadcasts, ISDB-C for digital cable television, and the like.

CITATION LIST

Patent Literature

PTL 1: Japanese Unexamined Patent Application Publication No. 2013-38520

SUMMARY

Technical Problem

Figure 2:
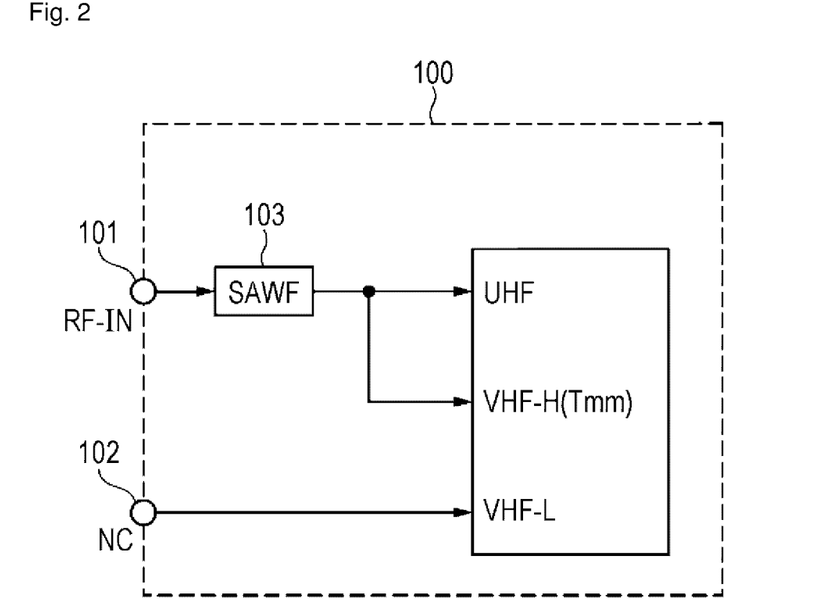
FIG. 2 is a block diagram used to describe a tuner in the related art.

In order for air-reception of both a terrestrial digital broadcast (UHF) and a multimedia broadcast for a mobile terminal ISDB-Tmm, it is necessary to suppress interference waves other than these reception bands by using a filter. For example, FIG. 2 shows a tuner 100 in the related art. The tuner 100 has an UHF input, a VHF-H input, and a VHF-L input. The RF inputs from the input terminal 101 are supplied to the UHF input of the tuner 100 through a surface acoustic wave filter (SAWF) 103. Inputs from the input terminal 102 are supplied to the UHF input of the tuner 100.

Figure 3:
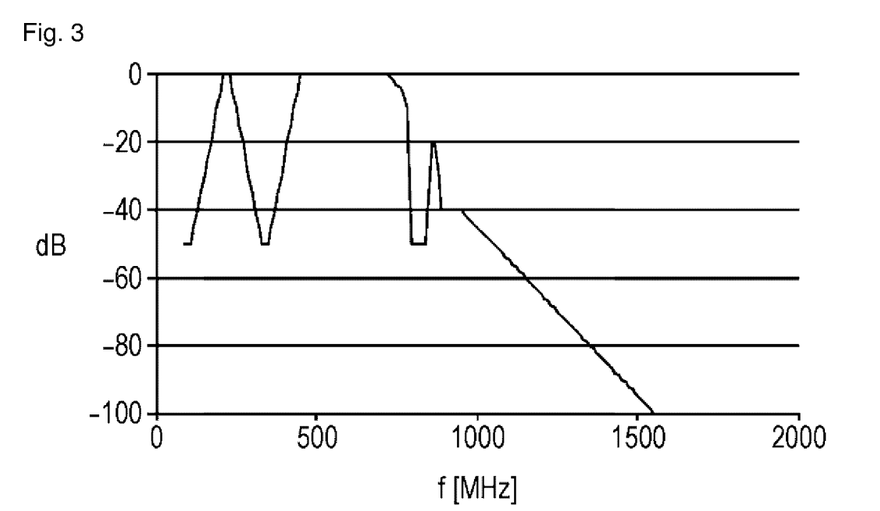
FIG. 3 is a schematic diagram used to describe frequency characteristics of the tuner in the related art.

FIG. 3 shows an example of the frequency characteristics of the input of the tuner in a case of the air-reception of the terrestrial digital broadcasts and the multimedia broadcasts for a mobile terminal. As shown in FIG. 3, in order to receive ISDB-Tmm and UHF, there is provided a filter that passes only the bands of (207.5 to 222 [MHz]) and (470 to 770 [MHz]) and attenuates other bands. In other words, since other bands are allocated to other applications such as railway wireless communication, and fire wireless communication, it is necessary to sufficiently attenuate the other bands.

Thus, in a case of having frequency characteristics in which the attenuation is large in the bands of VHF-L and MID, substantially the CATV pass-through method is no longer possible, and even if the antenna terminal on the wall surface is connected with the mobile terminal directly or through a cradle, a desktop holder, or the like, there is a concern that it is difficult to view or record a terrestrial digital broadcast satisfactorily.

Accordingly, it is desirable to provide a television receiver, a television broadcast receiving method and a mobile terminal which have a plurality of antennas in which good air-reception is possible by automatically selecting an antenna, and good reception of a terrestrial digital broadcast corresponding to a CATV pass-through method and a multimedia broadcast for a mobile terminal is possible.

Solution to Problem

According to a first embodiment of the present disclosure, there is provided an apparatus comprising a plurality of antenna terminals, a first switch configured to select an antenna terminal of the plurality of antenna terminals, a second switch configured to receive an output of the antenna terminal from the first switch and divide the output of the antenna terminal into a first output and a second output, a surface acoustic wave filter configured to receive the first output from the second switch, and a tuner/decoder configured to receive an output of the surface acoustic wave filter and the second output.

According to a second embodiment of the present disclosure, there is provided a method comprising determining control signals based on a broadcast from a first antenna terminal of a plurality of antenna terminals, in an unlocked state, transmitting the control signals from a tuner/decoder to a first switch and a second switch to transition to a locked state, wherein the control signals control the first switch to select a second antenna terminal of the plurality of antenna terminals and control the second switch to output the broadcast to at least one of a surface acoustic wave filter and the tuner/decoder, and in the locked state, receiving the broadcast at the tuner/decoder from at least one of the second antenna terminal and the surface acoustic wave filter.

Advantageous Effects of Invention

According to the present disclosure, it is possible to automatically select an antenna in which the best television broadcast reception is possible. Further, since a wired antenna input covering all bands is contained, good television broadcast reception is possible.

DESCRIPTION OF EMBODIMENTS

The embodiments to be described below are preferred embodiments of the present disclosure, and technically preferable various limitations are applied thereto. However, in the following description, unless there is a statement that particularly limits the present disclosure, the scope of the present disclosure is not intended to be limited to these embodiments.

The following description will be made in the following order.
(1. First Embodiment)
(2. Second Embodiment)
(3. Modification examples)

1. First Embodiment

Figure 4:
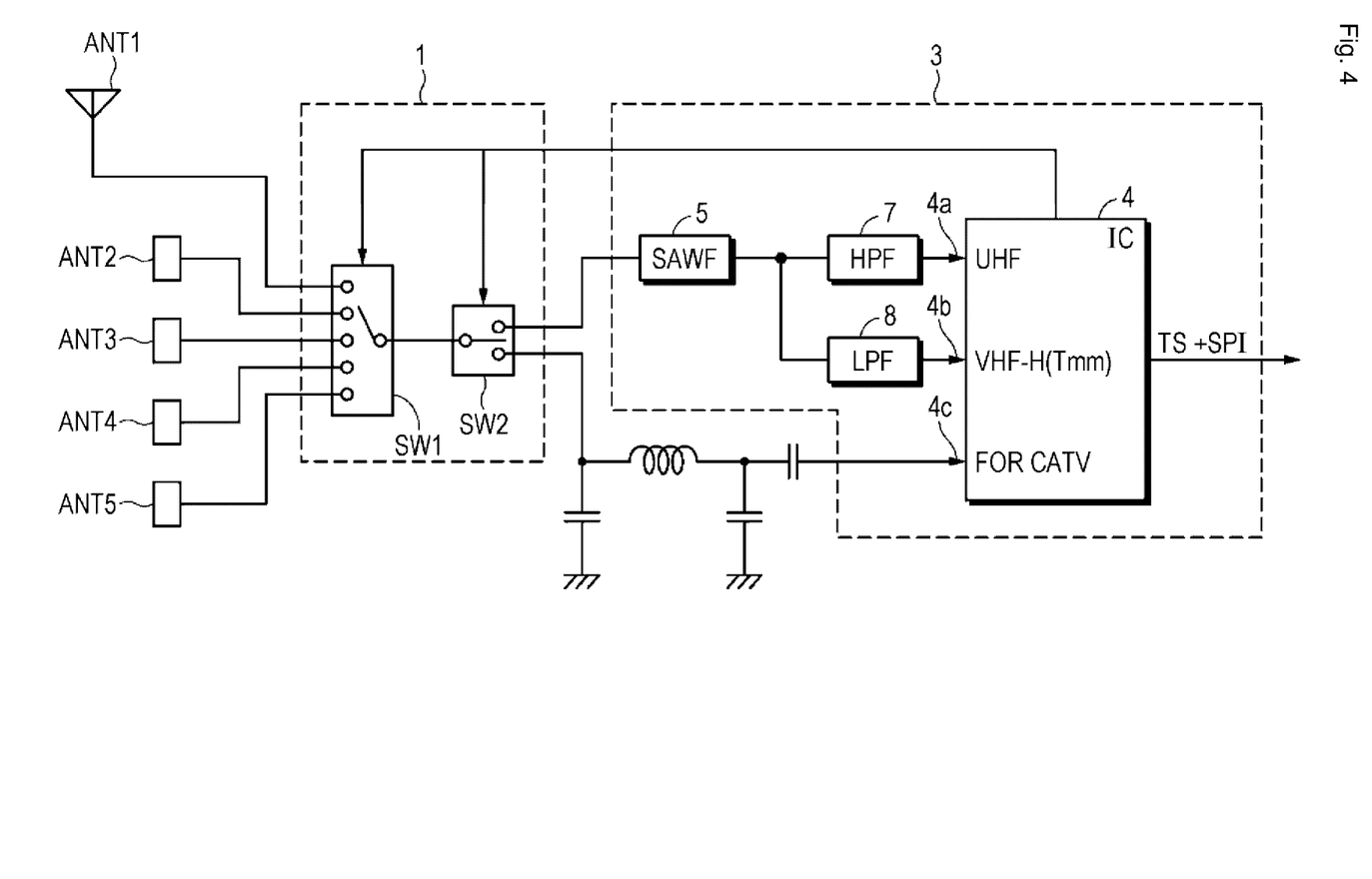
FIG. 4 is a block diagram of a first embodiment of the present disclosure.

A first embodiment of the present disclosure will be described with reference to FIG. 4. For example, five antenna terminals ANT1 to ANT5 (specifically, connectors for antenna connection) are provided. A rod antenna attached to a mobile terminal, for example, a tablet terminal is connected to the antenna terminal ANT1.

For example, an antenna using an earphone cable of 3.5 mm diameter is connected to the antenna terminal ANT2, and an antenna using a micro USB cable of 2.5 mm diameter is connected to the antenna terminal ANT3. In addition, the antenna terminal ANT4 is connected to an antenna terminal (for example, F-type connector) on the wall surface of a room by a coaxial cable. The antenna terminal ANT5 is connected to an F-type connector such as a desktop holder and a cradle by a coaxial cable. The antenna terminal ANT4 is a connector for a terrestrial digital broadcast, and the antenna terminal ANT5 is a connector for a multimedia broadcast ISDB-Tmm band for a mobile terminal. In addition, these antennas are only examples, and other antennas such as an antenna using a power cable may be used.

Five antenna signals are supplied to an antenna switching unit 1. The antenna switching unit 1 is configured to have antenna switching switches SW1 and SW2. The antenna switching switch SW1 is for selecting any one among five antenna signals, and the antenna signal selected by the antenna switching switch SW1 is supplied to the switching switch SW2.

The switching switch SW2 divides an input into two outputs and supplies the outputs to the module 3 according to a received frequency. The module 3 includes a tuner and decoder 4 formed into an IC. The tuner and decoder 4 includes a UHF input port 4a, a VHF-H input port 4b and a CATV input port 4c. The output of one side of the switching switch SW2 is supplied to a surface acoustic wave filter 5, and the output of the other side thereof is supplied to the CATV input port 4c of the tuner and decoder 4. In this example, the CATV input port 4c does not correspond to UHF.

The output signals of the surface acoustic wave filter 5 are supplied to a high pass filter 7 and a low pass filter 8. UHF signals are selected by the high pass filter 7, and the selected UHF signals are supplied to the UHF input port 4a of the tuner and decoder 4. The VHF-H (ISDB-Tmm band) signals are selected by the low pass filter 8. The selected VHF-H signals are supplied to the VHF-H input port of the tuner and decoder 4.

The tuner in the tuner and decoder 4 frequency-converts the input signals of each band into intermediate frequency signals. The intermediate frequency signals are supplied to the decoder, and the transport streams (TS) are demodulated by the decoder. The decoder includes a demodulator, an error corrector, and a transport stream decoder.

As an example, ISDB-T is used as a method of a terrestrial digital broadcast (full segments/one segment), and ISDB-Tmm is used as a method of a multimedia broadcast for a mobile terminal. Since these methods are a family of ISDB of digital broadcast methods, signal processing in the tuner and decoder 4 can be shared. Note that methods other than ISDB-Tmm may be used as the multimedia broadcast for a mobile terminal.

In the antenna switching switch SW1, switching is controlled according to an algorithm for antenna switching described later. The switching switch SW2 selects an input port of the tuner and decoder 4 depending on the frequency to be received. The control signals for control of the switches SW1 and SW2 are supplied from the tuner and decoder 4. The control signals are generated in the tuner and decoder 4. Note that the control signals of the antenna switching may be generated in a host controller controlling all processes of a mobile terminal.

Modification Example of the First Embodiment

Figure 5:
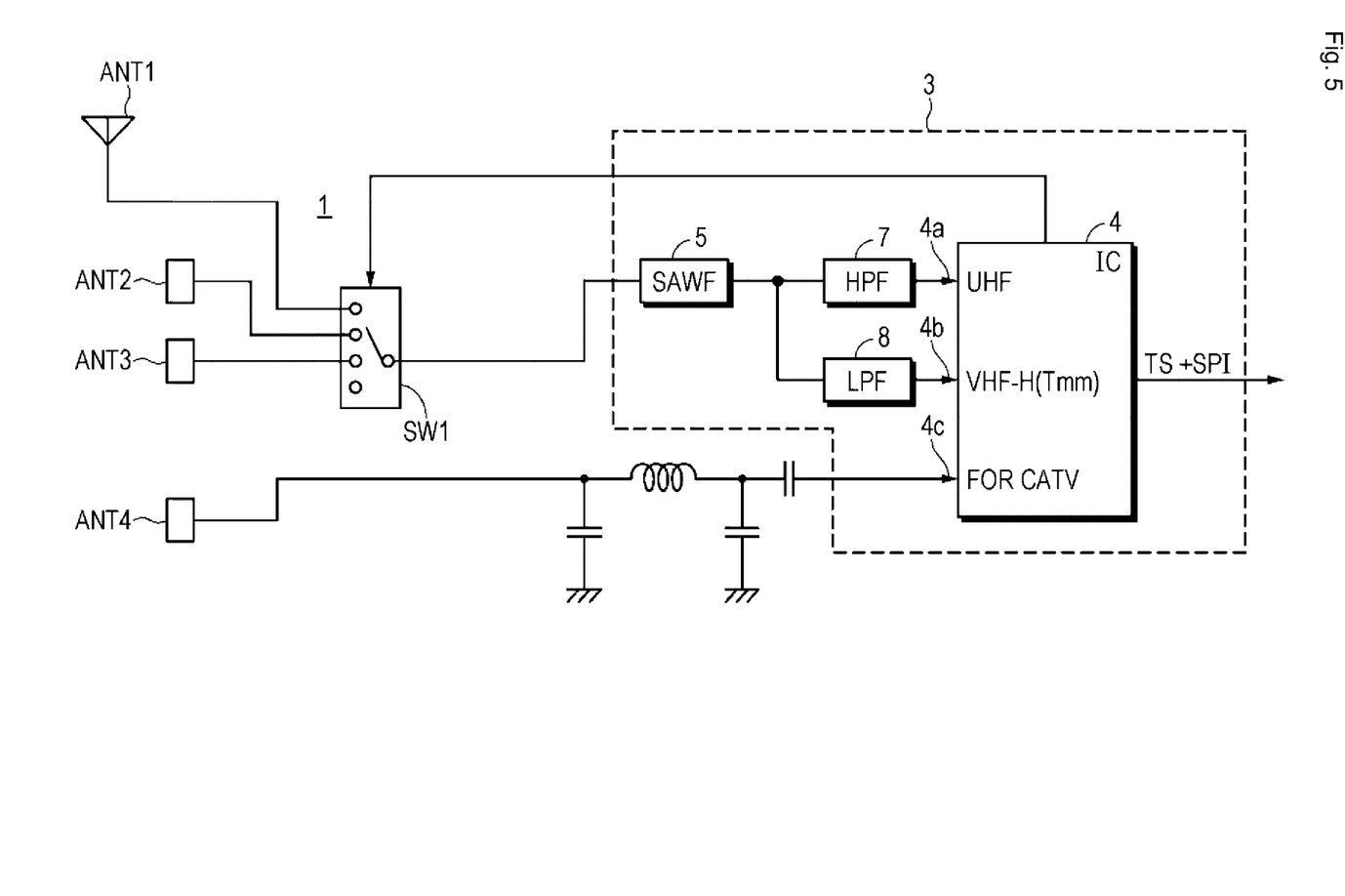
FIG. 5 is a block diagram of a modification example of the first embodiment of the present disclosure.

In a case where the CATV input port 4c of the tuner and decoder 4 corresponds to an entire band (a transmission band (90 to 770 [MHz]) including VHF-L, VHF-H, SHB and UHF), it is possible to have a configuration shown in FIG. 5. In other words, it is assumed that the antenna terminal ANT4 of the wall surface and the CATV input port 4c of the tuner and decoder 4 are directly connected. Accordingly, the switching switch SW2 can be omitted, thereby allowing the circuit configuration to be simplified. In the first embodiment of the above described present disclosure, it is possible to satisfactorily receive CATV (terrestrial digital broadcasts) without being affected by a filter for interference suppression at the time of air-reception and to record the program content obtained from the input of CATV.

(Algorithm for Antenna Automatic Switching)

Figure 6:
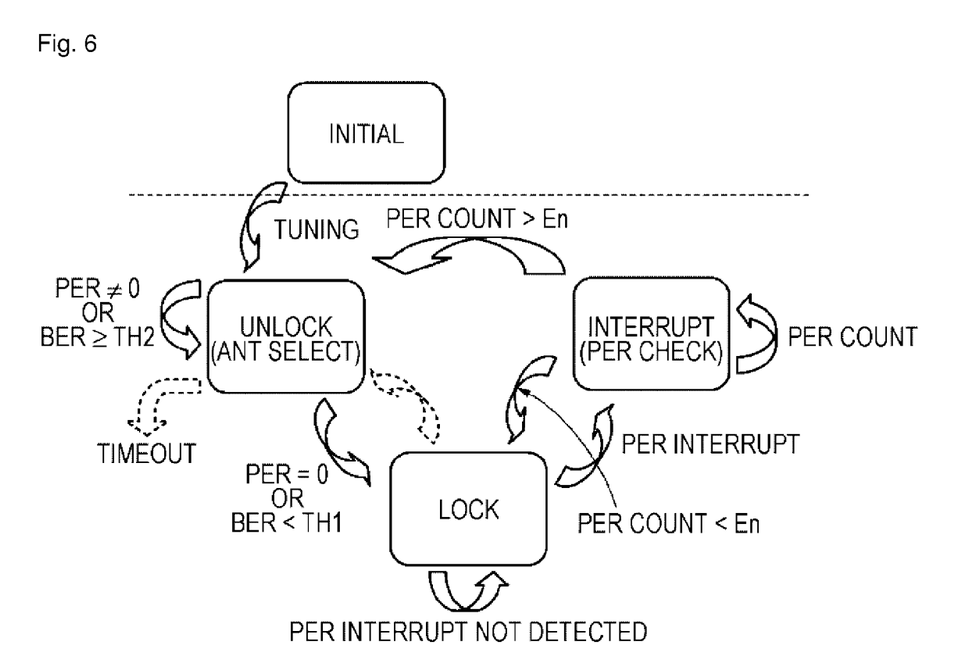
FIG. 6 is a schematic diagram showing a state transition used to describe antenna switching in the first embodiment of the present disclosure.
Figure 7:
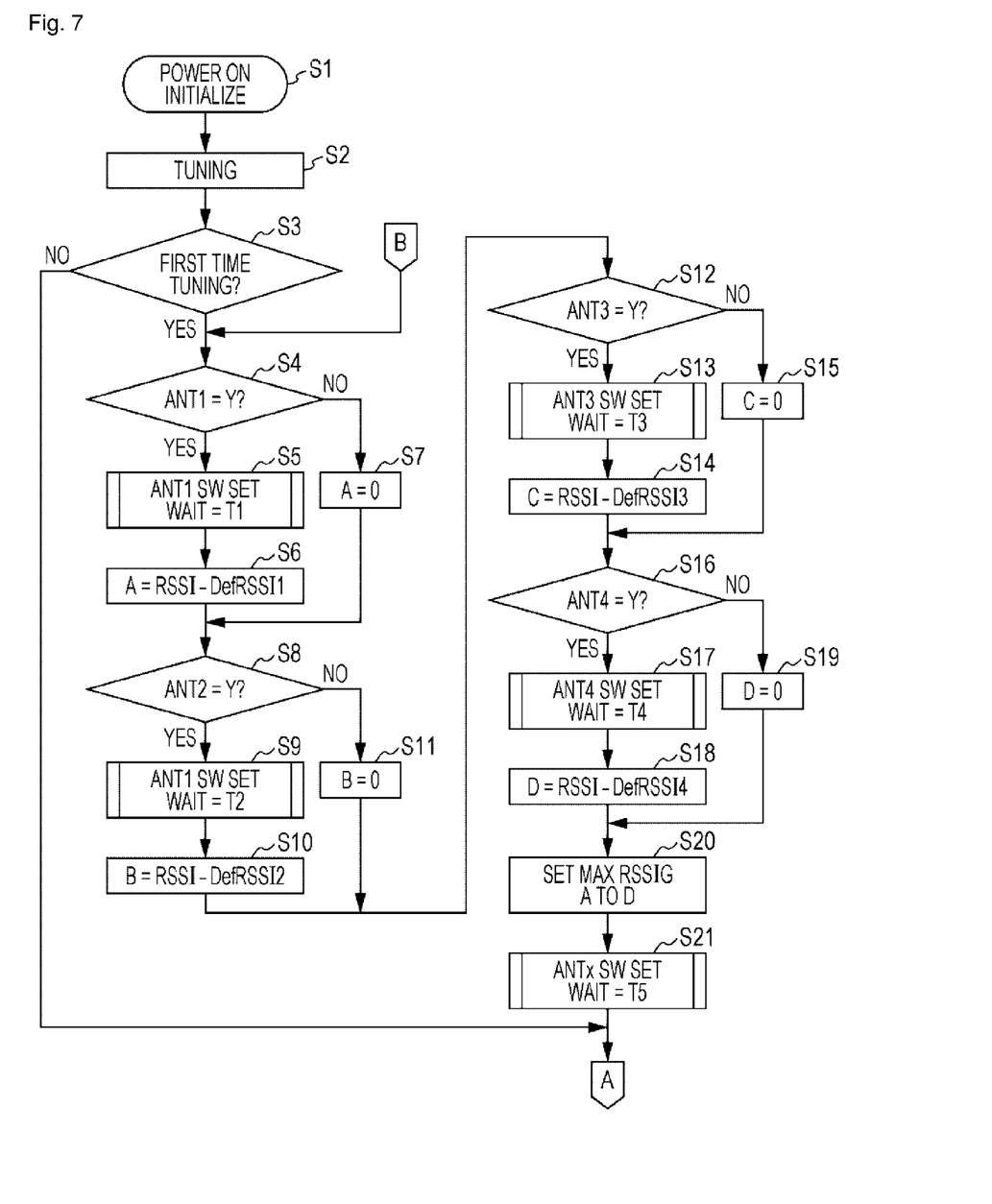
FIG. 7 is a flow chart used to describe the antenna switching in the first embodiment of the present disclosure.
Figure 8:
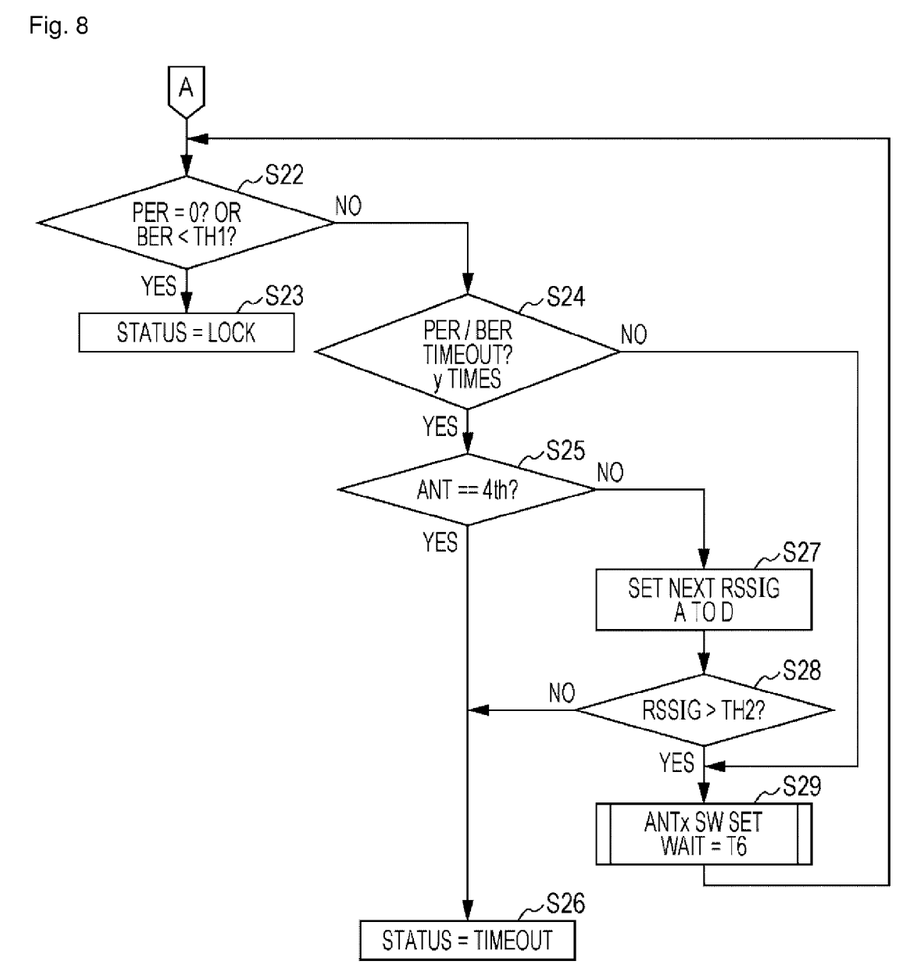
FIG. 8 is a flow chart used to describe the antenna switching in the first embodiment of the present disclosure.
Figure 9:
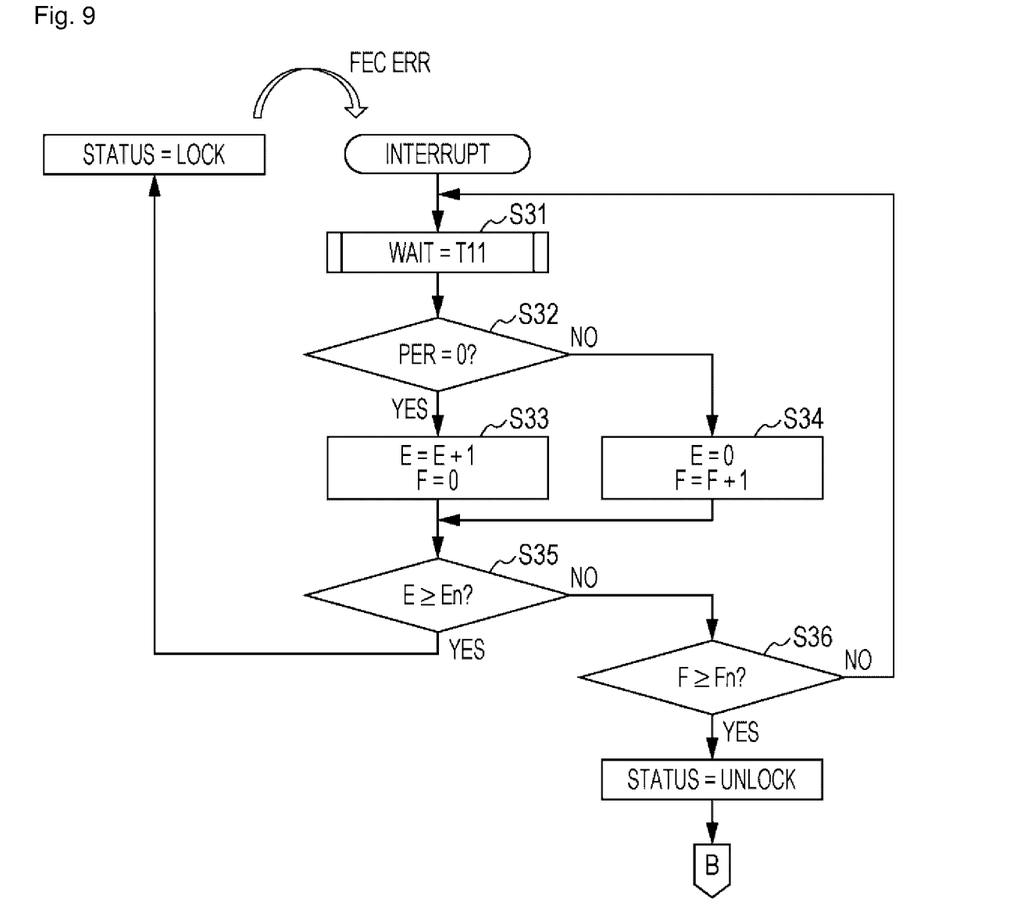
FIG. 9 is a flow chart used to describe the antenna switching in the first embodiment of the present disclosure.

An algorithm for automatically switching the antenna switching switch SW1 that is performed by a Micro Controller Unit (MCU) included in the tuner and decoder 4 will be described. The state transition diagram at the time of control of switching is shown in FIG. 6, and the flow of the control process is shown in the flowcharts of FIGS. 7 to 9. In addition, although the flowchart of FIGS. 7 and 8 show the flows of a series of processes, the flow is divided into two figures in relation to the drawing space. In addition, it is assumed that in the processes shown in the flowcharts, the signals from four antenna terminals ANT1 to ANT4 are input to the antenna switching switch SW1.

A first step S1 of FIG. 7: Power is turned on, and an initial process is performed. This corresponds to the initial state in the state transition diagram of FIG. 6.

Step S2: Tuning is performed.

Step S3: It is determined whether or not the tuning is a first time of tuning.

Step S4: The presence or absence (Y/N) of an antenna with respect to the antenna terminal ANT1 (for example, rod antenna) is determined. The determination result is saved. It is preferable that the determination as to whether or not an antenna is connected to the antenna terminal be performed at the time of the initial process, for example, when power is turned on, and the determination result be saved. The process in step S4 may be only to examine the determination result. The process described later as to the presence or absence of the antenna with respect to the antenna terminal is the same. The presence or absence of the antenna is detected in advance and saved, thereby avoiding an antenna terminal to which an antenna is not connected from being selected and causing the process to be performed quickly.

Step S5: If it is determined that there is the antenna terminal ANT1 (for example, rod antenna), the antenna switching switch SW1 is set to select the antenna terminal ANT1. The waiting time T1 is set. It is possible that the waiting time T1 be set to a desired value in advance. The waiting time described later can be also customized.

Step S6: A signal strength is calculated by the expression of A=RSSI−DefRSSI1. RSSI is a signal strength which is detected. DefRSSI indicates the level of a no signal state when the antenna corresponding to the antenna terminal ANT1 is connected, and DefRSSI is detected in advance and saved. Through the operation of step S6, it is possible to calculate not only the signal strength but also the signal purity. In addition, information regarding the signal strength can be obtained from the gain control signal of an AGC circuit included in the tuner and decoder.

Step S7: In a case where it is determined in step S4 that there is no antenna in the antenna terminal ANT1, it is set that A=0.

Step S8: Presence or absence (Y/N) of an antenna with respect to the antenna terminal ANT2 is determined. The determination result is saved.

Step S9: If it is determined that the antenna is connected to the antenna terminal ANT2, the antenna switching switch SW1 is set to select the antenna terminal ANT2. The waiting time T2 is set.

Step S10: The signal strength is calculated by the expression of B=RSSI−DefRSSI2. DefRSS2 indicates the level of a no signal state when the antenna corresponding to the antenna terminal ANT2 is connected, and DefRSS2 is detected in advance and saved. Through the operation of step S10, it is possible to calculate not only the signal strength but also the signal purity.

Step S11: In a case where it is determined in step S8 that there is no antenna in the antenna terminal ANT2, it is set that B=0.

Step S12: Presence or absence (Y/N) of an antenna with respect to the antenna terminal ANT3 is determined. The determination result is saved.

Step S13: If it is determined that the antenna is connected to the antenna terminal ANT3, the antenna switching switch SW1 is set to select the antenna terminal ANT3. The waiting time T3 is set.

Step S14: The expression of C=RSSI−DefRSSI3 is calculated. DefRSS3 indicates the level of a no signal state when the antenna corresponding to the antenna terminal ANT3 is connected, and DefRSS3 is detected in advance and saved. Through the operation of step S14, it is possible to calculate not only the signal strength but also the signal purity.

Step S15: In a case where it is determined in step S12 that there is no antenna in the antenna terminal ANT3, it is set that C=0.

Step S16: Presence or absence (Y/N) of an antenna with respect to the antenna terminal ANT4 is determined. The determination result is saved.

Step S17: If it is determined that the antenna is connected to the antenna terminal ANT4, the antenna switching switch SW1 is set to select the antenna terminal ANT4. The waiting time T4 is set.

Step S18: The expression of D=RSSI−DefRSSI4 is calculated. DefRSS4 indicates the level of a no signal state when the antenna corresponding to the antenna terminal ANT4 is connected, and DefRSS4 is saved. Through the operation of step S17, it is possible to calculate not only the signal strength but also the signal purity.

Step S19: In a case where it is determined in step S16 that there is no antenna in the antenna terminal ANT4, it is set that D=0.

Step S20: A maximum value is obtained among the signal strengths A to D which are obtained and saved as described above.

Step S21: The antenna switching switch SW2 is controlled to select the signal with the maximum value of signal strength. The process waits for time T5 after the antenna switching switch SW2 is set, and the state is monitored. After time T5 has been elapsed, the process proceeds to the following steps.

In addition, the flow of the process will be described referring to the flowchart of FIG. 8.

Step S22: It is determined whether or not a Packet Error Rate (PER)=0. Bit Error Rate (BER) is used instead of the PER, thereby enabling a process of determining whether or not BER<TH1 to be performed. The PER and the BER are obtained from the result of the error correction processing of the tuner and decoder 4.

Step S23: In a case where the determination result in step S22 is positive, in other words, in a case where there are few errors resulting from the demodulation process, the state becomes the locked state.

As shown in the state transition diagram of FIG. 6, the time when the process has reached step S23 is the locked state, while a state where the signal strength is obtained and an antenna having the maximum value of the signal strength is obtained is the unlocked state.

Step S24: If it is determined in step S22 that there are a lot of errors, the process of step S22 is performed, time is out until the result of step S22 becomes positive, and it is determined whether the time-out occurs a preset number of times y.

Step S25: When the determination result of step S24 is positive, it is determined whether the antenna terminal is a fourth antenna terminal.

Step S26: If it is determined that the antenna terminal is the fourth antenna terminal in step S25, the state is timed out (see FIG. 6).

Step S27: If it is determined that the antenna terminal is not the fourth antenna terminal in step S25, the antenna terminal is set with which a second largest signal strength among signal strengths A to D occurs. As the order of signal strength, for example, what is obtained in the initial state such as the time of power-on and the switching of the operation mode of the device is used. It is possible to shorten the antenna selecting time by the processing of setting the antennas in order from the antenna having highest signal strength.

Step S28: It is determined whether the signal strength of the antenna terminal which is set is greater than the threshold value TH2. The threshold value TH2 is a value of the above described threshold value TH1 or less. If the signal strength is less than the threshold value TH2, the process returns to step S26 (time-out state).

Step S29: In step S28, in order to select the antenna terminal of which the signal strength is determined to be greater than the threshold value TH2, after the waiting time T6 has elapsed, the antenna switching switch SW2 is set. Then, the process returns to step S22.

As shown in FIG. 6, the reception is started from the initial state and the state is transited from the unlocked state to the locked state based on PER or BER. In the locked state, a television broadcast is received by the selected antenna. Here, if a PER occurs, the state is transited to an interrupt state by using PER as a trigger.

In the interrupt state, for example, PERs during a predetermined period are counted, and the number of PERs is compared with a threshold value. In a case where the count value of the PER is smaller than the threshold value, the state returns to the locked state. On the contrary, in a case where the count value of the PER is greater than the threshold value, the state is transited to the unlocked state.

By providing such an interrupt state in addition to the locked state and unlocked state, it is possible to avoid images and audio from being frequently interrupted because antenna switching occurs predictably and unnecessarily. In addition, when the error occurs by PER, the state is transited from the locked state to the interrupt state, so that the burden on the software is reduced, and it is possible to avoid the image and the audio from being interrupted unnecessarily, in a situation where a viewing state is good.

A flow of the process of the interrupt state is described referring to a flowchart of FIG. 9. In the locked state, if a Forward Error Correction (FEC) error occurs, a transition to the interrupt state occurs.

Step S31: Wait for the set time T11.

Step S32: It is determined whether or not PER=0. In response to the result, the variables of the error count number E and the error count value F are changed. PER=0 indicates that there is no error, and PER=1 indicates that there is an error.

Step S33: If it is determined that PER=0, the error count number E is incremented and the error count value F does not change.

Step S34: If it is not determined that PER=0, the error count number E does not change and the error count value F is incremented.

Step S35: The error count number E is compared with a threshold value En that is set in advance. If a relationship in which E is equal to or more than En is established, the state returns to the locked state.

Step S36: If a relationship of E<En is established in step S35, the error count value F is compared with a threshold value Fn that is set in advance. If a relationship in which F is equal to or more than Fn is established, the state is transited to the unlocked state. Specifically, as an antenna selecting request, the process proceeds to step S4 in FIG. 7. On the contrary, if the error count value F is smaller than the threshold value Fn in step S36, the process returns to step S31 (waiting).

As described above, in the state transition diagram shown in FIG. 6, the best antenna is selected based on the signal strength in the unlocked state, and thereafter an error state is inspected. If the error state is good, that is, in a case where (PER=0) or (BER<TH1), the state is transited from the unlocked state to the locked state. In the locked state, PER is monitored, and if an error occurs, the state is transited from the locked state to the interrupt state.

In the interrupt state, if the count value of errors during a predetermined period is smaller than the threshold value En, the state is transited from the interrupt state to the locked state. On the other hand, in the interrupt state, if the count value of errors during a predetermined period is greater than the threshold value En, the state is transited to the unlocked state. It is possible to perform the antenna switching by such a control in order to avoid an image and audio from being interrupted by reducing the burden on the software.

2. Second Embodiment

A second embodiment of the present disclosure will be described. In a terrestrial digital broadcast, an OFDM (Orthogonal Frequency Division Multiplex) modulation method is used. The modulation method has a feature of being strong to the environment of multiple reflection propagation (so-called multi-path) and a transmission error rate being suppressed to be low. There is a technology called a diversity reception capable of improving the reception intensity of radio waves. The diversity reception is a technique which receives broadcast waves by a plurality of antennas of which the receiving conditions vary with respect to each other, and selects an antenna with the best reception state from among the antennas or synthesizes the received radio waves by the plurality of antennas, thereby further improving the reception quality as compared to a case of the reception by one antenna. It is possible to improve the reception quality more effectively by using a combination of the diversity reception and the OFDM. The second embodiment is intended to perform the diversity reception.

Figure 10:
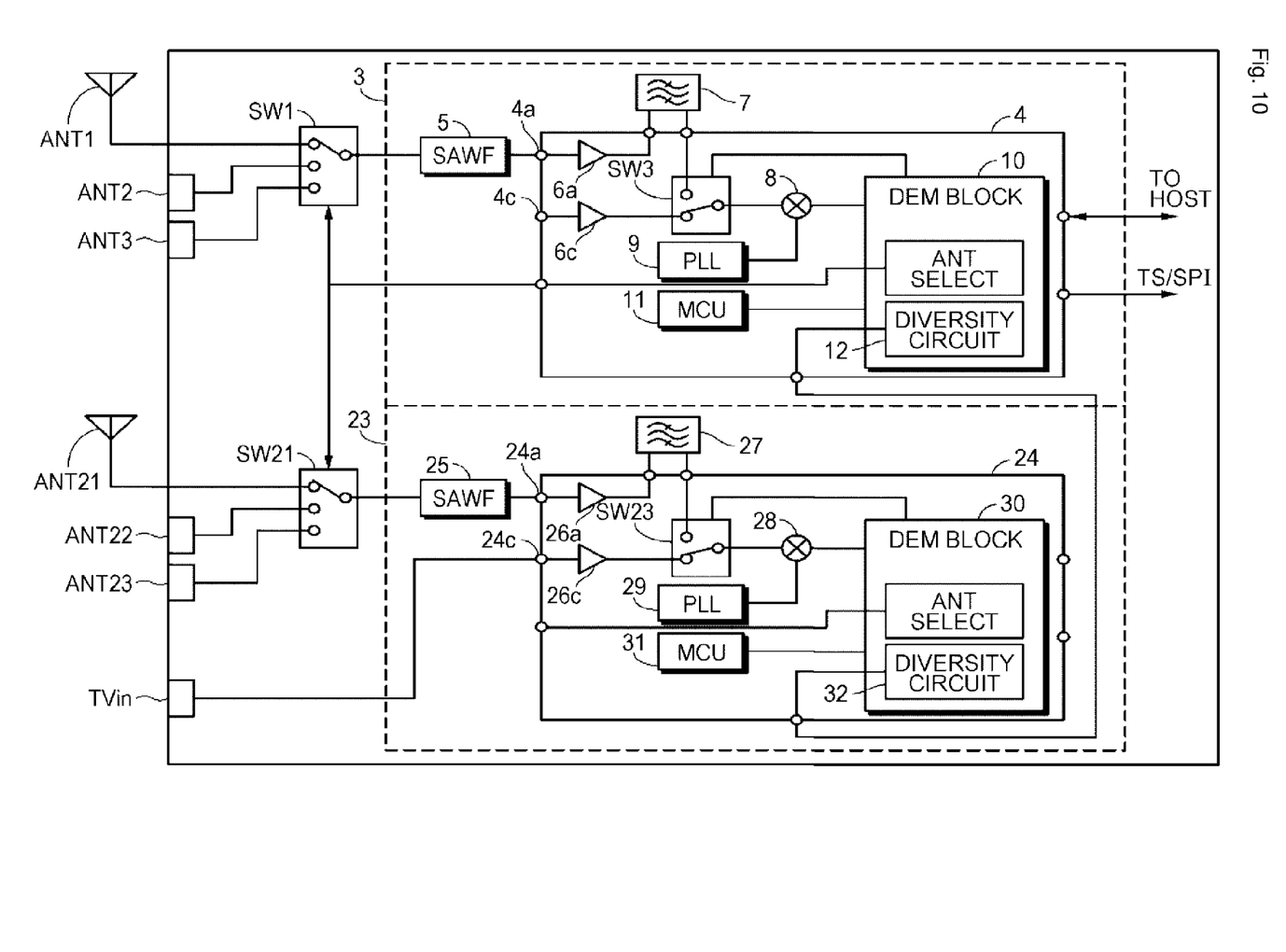
FIG. 10 is a block diagram of a second embodiment of the present disclosure.

As shown in FIG. 10, a plurality of modules, for example, a master module 3 and a slave module 23 are provided. Each module has the same configuration as that of the first embodiment described above. Describing the master module 3, the received signals from the antenna terminal (rod antenna) ANT1, the antenna terminal ANT2 and the antenna terminal ANT3 are input to the antenna switching switch SW1. The signal selected by the antenna switching switch SW1 is supplied to the input terminal 4a of the tuner and decoder 4 through the surface acoustic wave filter 5.

In the configuration shown in FIG. 10, it is assumed that the tuner and decoder 4 has only a single input terminal 4a as a broadcast signal input terminal. However, as described above, a separate input terminal for the multimedia broadcast for the mobile terminal may be provided. The tuner and decoder 4 further includes the CATV input terminal 4c.

The broadcast signals from the input terminal 4a are supplied to the input of one side of a switching switch SW3 through a filter 7 which is externally connected to a Low Noise Amplifier (LNA) 6a and the module IC. Since in a case of directly receiving the broadcast waves, various wireless signals such as wireless signals for a mobile phone, a wireless LAN, and Bluetooth (registered trademark) which are transmitted by a terminal itself interfere as interference waves, it is necessary to perform the removal of the interference waves by using a filter or the like having a steep characteristic. Further, in order to adapt to the situation of the received waves, a LNA 6a which is excellent in Noise Figure (NF) characteristics is demanded. If the NF of the amplifier is small, the noise generated in the amplifier can be reduced, and as a result, the antenna can be small.

The LNA 6c is connected to the input terminal 4c, and signals for CATV are supplied to the input of the other side of the switching switch SW3 through the LNA 6c. When the broadcast of the CATV band is received through a cable instead of direct reception, a band to be used is in a relatively wide range of (90 to 770 [MHz]) in Japan. If a system having the filter for interference removal as in the case of performing a direct reception is applied, there is a case where it is difficult to receive the desired waves. In addition, the input signal quality is relatively stable and low NF characteristics as the case of the direct reception are not necessary in the LNA 6c of the input stage. However, it is necessary to cope with the reception of a broad band.

The output signals of the switch SW3 are supplied to a multiplier 8. The signals from a Phase Locked Loop (PLL) 9 are supplied to the multiplier 8, and the intermediate frequency signals from the multiplier 8 are extracted. The intermediate frequency signals are supplied to a demodulator and decoder 10, in which the demodulation and decoding is performed. The demodulator and decoder 10 includes a demodulator, an error corrector, and a transport stream decoder in which transport streams are extracted.

A MCU 11 is provided in conjunction with the demodulator and decoder 10. The demodulator and decoder 10 performs the processing under the control of the MCU 11, and control signals (ANT select) for the antenna switching as described above are generated. Further, a diversity circuit 12 is provided in the demodulator and decoder 10. The demodulator and decoder 10 is adapted to communicate with a host controller.

The slave module 23 has the same configuration as that of the master module 3 described above. A plurality of antenna terminals ANT21, ANT22, and ANT23 are connected to the slave module 23, and one thereof is selected by an antenna switching switch SW21. In addition, an antenna terminal TVin that is connected to the antenna terminal on the wall surface or the antenna terminal of the cradle is provided. The signals from the antenna terminal TVin are supplied to a CATV input terminal 24c of the tuner and decoder 24. The signals selected by the switching switch SW23 are converted into the intermediate frequency signals in the multiplier 28 and are input to the demodulator and decoder 30.

A diversity circuit 32 provided in the demodulator and decoder 30 is connected to the diversity circuit 12 of the master module 3. The control signals for antenna selection are generated in the demodulator and decoder 10 based on the reception status of the plurality of antennas obtained by the diversity circuits 12 and 32. The antenna switching switches SW1 and SW21 are controlled by the control signals.

In the second embodiment, the received signals of each module on the master side are diversity combined. The selection of an antenna is performed by a process similar to the first embodiment described above, but the switching operation is performed by the determination of the master side as to a combination in which the characteristics obtained after the synthesis become the best, instead of the information regarding the signal strength obtained from the individual antennas.

Figure 11:
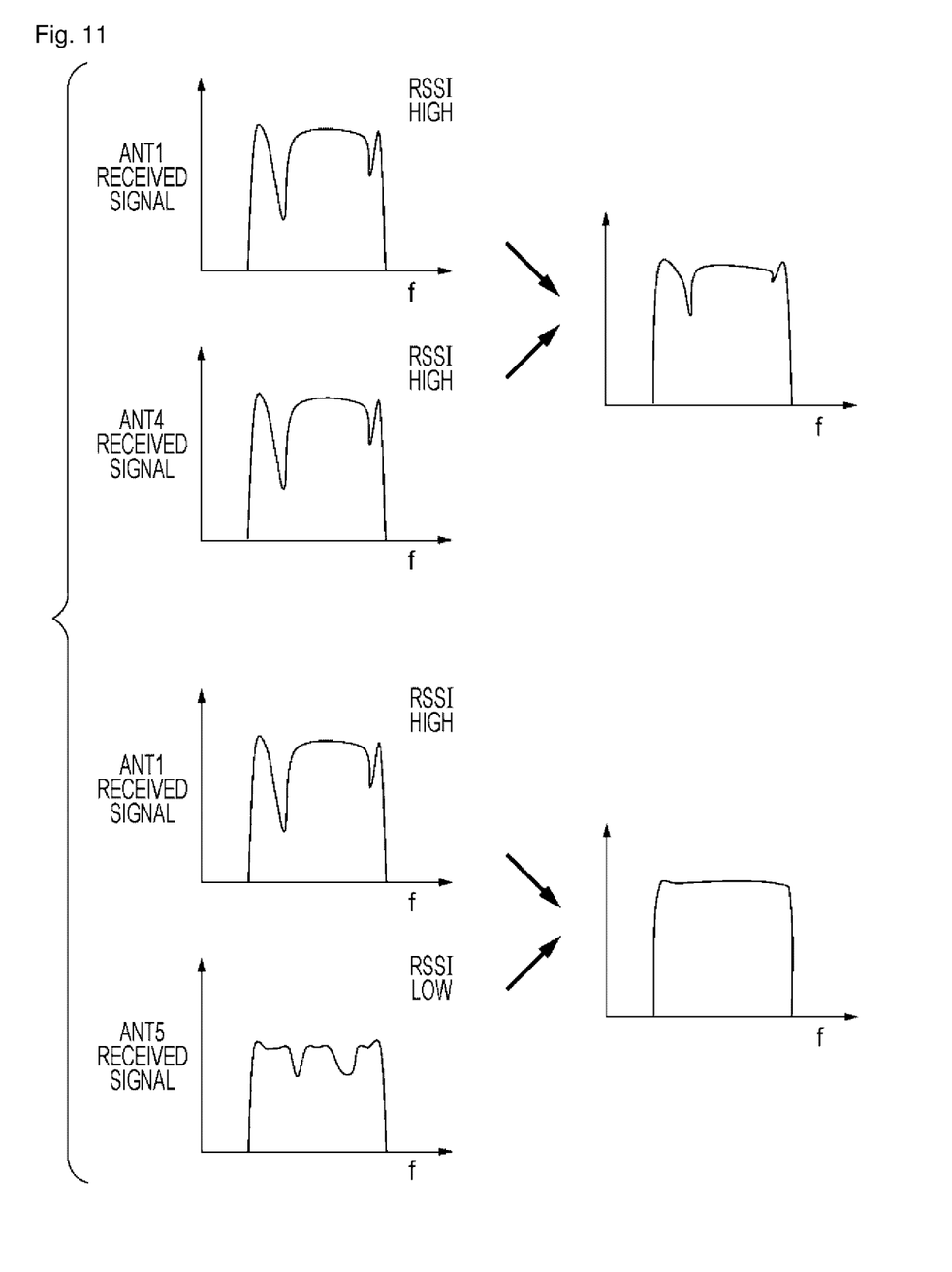
FIG. 11 is a schematic diagram used to describe the second embodiment of the present disclosure.

Description will be made about the process of determining optimal antennas by using the characteristics obtained after synthesis by referring to FIG. 11. FIG. 11 shows the frequency characteristics of the received signals from respective antenna terminals ANT1 and ANT4, and the frequency characteristics of the received signals after the received signals are diversity combined. Furthermore, FIG. 11 shows, as other combinations, the frequency characteristics of the received signals from respective antenna terminals ANT1 and ANT5, and the frequency characteristics of the received signals after the received signals are diversity combined.

The signal strengths RSSI of the received signals of the ANT1 and the ANT4 are high, but the strength RSSI of the received signal of the ANT5 is low. However, if the signal strength after the synthesis is viewed, the combination of the received signal of the ANT1 and the received signal of the ANT5 becomes a higher signal strength. As in this example, the diversity circuit 12 on the master side generates a control signal for selecting antennas based on the signal strength obtained after the synthesis of two antennas.

Although the antenna switching algorithm is similar to the first embodiment described above, only a process of determining an antenna in the unlocked state is different. In the first embodiment, the antenna is determined based on the value of the signal strength. In contrast, in the second embodiment, antenna combinations are checked sequentially while being switched, and a combination is selected of which the carrier to noise ratio (C/N) obtained after the diversity combination has a maximum value. More specifically, the optimum antenna combination is selected based on the C/N obtained after the diversity combination with respect to all antenna combinations. In addition, in the above description, although two sets of receiving units are used, diversity reception using receiving units of three or more sets may be performed.

3. Modification Examples

Hitherto, although embodiments of the present disclosure have been described in detail, the present disclosure is not limited to the above respective embodiments, and various modifications based on the technical idea of the present disclosure are possible. For example, configurations, methods, steps, shapes, materials and numeric values presented in the above embodiments are only examples, and configurations, methods, steps, shapes, materials and numeric values which are different from the above embodiments may be used as necessary.

For example, in the present disclosure, when a cable is connected to an antenna terminal for CATV, inputs for CATV may be preferentially selected. Further, the present disclosure may be applied to devices such as vehicle AV equipment, car navigation devices, and portable televisions other than mobile terminals. Furthermore, the present disclosure may be applied not only to the broadcasts in Japan but also to digital broadcasts throughout the world.

In addition, the present disclosure may have the following configurations.

A01: First Embodiment

An apparatus comprising a plurality of antenna terminals, a first switch configured to select an antenna terminal of the plurality of antenna terminals, a second switch configured to receive an output of the antenna terminal from the first switch and divide the output of the antenna terminal into a first output and a second output, a surface acoustic wave filter configured to receive the first output from the second switch, and a tuner/decoder configured to receive an output of the surface acoustic wave filter and the second output.

A02

The apparatus of [A01], wherein the apparatus is a television receiver.

The apparatus of [A01] or [A02], wherein the apparatus is a mobile terminal.

The apparatus of any one of [A01] to [A03], further comprising a high pass filter and a low pass filter, wherein the high pass filter and the low pass filter are configured to filter the output of the surface acoustic wave filter.

The apparatus of any one of [A01] to [A04], wherein the plurality of antenna terminals are configured to connect to at least one of a rod antenna, an earphone antenna, a micro USB antenna, and an F-type connector.

The apparatus of any one of [A01] to [A05], wherein the plurality of antenna terminals include at least two F-type connectors.

The apparatus of any one of [A01] to [A06], wherein the plurality of antenna terminals include at least a first connector for a terrestrial digital broadcast and a second connector for a multimedia broadcast for a mobile terminal.

The apparatus of any one of [A01] to [A07], wherein the tuner/decoder is configured to generate control signals that control switching of the first switch and the second switch.

B01: Second Embodiment

A method comprising determining control signals based on a broadcast from a first antenna terminal of a plurality of antenna terminals, in an unlocked state, transmitting the control signals from a tuner/decoder to a first switch and a second switch to transition to a locked state, wherein the control signals control the first switch to select a second antenna terminal of the plurality of antenna terminals and control the second switch to output the broadcast to at least one of a surface acoustic wave filter and the tuner/decoder, and in the locked state, receiving the broadcast at the tuner/decoder from at least one of the second antenna terminal and the surface acoustic wave filter.

The method of [B01], further comprising detecting an error in the locked state and transitioning to an interrupt state.

The method of [B01] or [B02], further comprising transitioning from the interrupt state to the unlocked state.

The method of any one of [B01] to [B03], further comprising transitioning from the unlocked state to the locked state, wherein the control signals control the first switch to select a third antenna terminal of the plurality of antenna terminals, and in the locked state, receiving the broadcast at the tuner/decoder from at least one of the third antenna terminal and the surface acoustic wave filter.

The method of any one of [B01] to [B04], wherein in the interrupt state, a number of errors during a predetermined period are counted, and the number of errors is compared with a threshold value to determine whether to transition to one of the locked state and the unlocked state.

The method of any one of [B01] to [B05], wherein the control signals are determined based on an error rate of the broadcast.

The method of any one of [B01] to [B06], wherein the second antenna terminal is an F-type connector.

The method of any one of [B01] to [B07], wherein the second antenna terminal is at least one of a first connector for a terrestrial digital broadcast and a second connector for a multimedia broadcast for a mobile terminal.

Moreover, the present disclosure may have the following configurations.

(1) A television receiver including: a plurality of antenna inputs; a selection unit which selects one of the plurality of the antenna inputs; a processing unit which processes a signal from the selected antenna input; and a control signal generating unit which generates a control signal for controlling the selection unit.

(2) The television receiver according to (1), a wired antenna input covering all bands of a transmission band is included in the plurality of antenna inputs.

(3) The television receiver according to (2), the wired antenna input covering all the bands is passed through the selection unit and supplied to the processing unit.

(4) The television receiver according to (1) or (2), the control signal generating unit obtains respective signal strengths of signals from the antenna inputs and selects the antenna input of which obtained signal strength is large and errors are few.

(5) The television receiver according to (4), the control signal generating unit obtains signal strengths regarding the plurality of antenna inputs in advance, and selects antenna inputs in order from an antenna input having large signal strength.

(6) The television receiver according to (4), the control signal generating unit determines whether there are the plurality of antenna inputs in advance, and omits processing on those without the antenna input.

(7) The television receiver according to (4), in a locked state in which one of the antenna inputs is selected, a process proceeds to an interrupt state in which an error occurs, and when in the interrupt state, it is confirmed that an error does not occur again or errors are few, the process returns to the locked state.

(8) The television receiver according to (1), the control signal generating unit combines the plurality of the antenna inputs and obtains signal strength after combination, and sets an antenna input having greatest signal strength obtained after the combination.

(9) A television broadcast receiving method including: selecting one of a plurality of antenna inputs, by a selection unit; processing a signal from the selected antenna input, by a processing unit; and generating a control signal for controlling the selection unit, by a control signal generating unit.

(10) A mobile terminal including: a plurality of antenna inputs; a selection unit which selects one of the plurality of the antenna inputs; a processing unit which processes a signal from the selected antenna input; and a control signal generating unit which generates a control signal for controlling the selection unit, in which a wired antenna input covering all bands of a transmission band being included in the plurality of antenna inputs.

(11) The mobile terminal according to (10), a signal for a terrestrial digital broadcast and a signal for a multimedia broadcast for the mobile terminal are included in all the bands.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

ANT1 to ANT5 Antenna terminal
SW1 Antenna switching switch
3, 23 Module
4, 24 Tuner and decoder

The invention claimed is:
1. An apparatus comprising:
  a plurality of antenna terminals;
  a first switch configured to select an antenna terminal of the plurality of antenna terminals;
  a second switch configured to receive an output of the antenna terminal from the first switch and divide the output of the antenna terminal into a first output and a second output;
  a surface acoustic wave filter configured to receive the first output from the second switch;
  a tuner/decoder configured to receive an output of the surface acoustic wave filter and the second output;
  a high pass filter; and
  a low pass filter,
  wherein the high pass filter and the low pass filter are configured to filter the output of the surface acoustic wave filter.
2. The apparatus of claim 1, wherein the apparatus is a television receiver.
3. The apparatus of claim 1, wherein the apparatus is a mobile terminal.

4. The apparatus of claim 1, wherein the plurality of antenna terminals are configured to connect to at least one of a rod antenna, an earphone antenna, a micro USB antenna, and an F-type connector.

5. The apparatus of claim 1, wherein the plurality of antenna terminals include at least two F-type connectors.

6. The apparatus of claim 1, wherein the plurality of antenna terminals include at least a first connector for a terrestrial digital broadcast and a second connector for a multimedia broadcast for a mobile terminal.

7. The apparatus of claim 1, wherein the tuner/decoder is configured to generate control signals that control switching of the first switch and the second switch.

8. A method comprising:
 determining control signals based on a broadcast from a first antenna terminal of a plurality of antenna terminals;
 in an unlocked state, transmitting the control signals from a tuner/decoder to a first switch and a second switch to transition to a locked state, wherein the control signals control the first switch to select a second antenna terminal of the plurality of antenna terminals and control the second switch to output the broadcast to at least one of a surface acoustic wave filter and the tuner/decoder;
 in the locked state, receiving the broadcast at the tuner/decoder from at least one of the second antenna terminal and the surface acoustic wave filter;
 detecting an error in the locked state; and
 transitioning to an interrupt state.

9. The method of claim 8, further comprising:
 transitioning from the interrupt state to the unlocked state.

10. The method of claim 9, further comprising:
 transitioning from the unlocked state to the locked state, wherein the control signals control the first switch to select a third antenna terminal of the plurality of antenna terminals, and in the locked state, receiving the broadcast at the tuner/decoder from at least one of the third antenna terminal and the surface acoustic wave filter.

11. The method of claim 7, wherein in the interrupt state, a number of errors during a predetermined period are counted, and the number of errors is compared with a threshold value to determine whether to transition to one of the locked state and the unlocked state.

12. The method of claim 7, wherein the control signals are determined based on an error rate of the broadcast.

13. The method of claim 7, wherein the second antenna terminal is an F-type connector.

14. The method of claim 7, wherein the second antenna terminal is at least one of a first connector for a terrestrial digital broadcast and a second connector for a multimedia broadcast for a mobile terminal.

* * * * *